(12) United States Patent
Brüchmann

(10) Patent No.: US 11,180,255 B2
(45) Date of Patent: Nov. 23, 2021

(54) AIRCRAFT SEAT, AIRCRAFT SEAT ARRANGEMENT WITH AN AIRCRAFT SEAT AND AIRCRAFT WITH AN AIRCRAFT SEAT ARRANGEMENT

(71) Applicant: Airbus Operations GmbH, Hamburg (DE)

(72) Inventor: Gerd Brüchmann, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 167 days.

(21) Appl. No.: 16/455,086

(22) Filed: Jun. 27, 2019

(65) Prior Publication Data

US 2020/0002005 A1    Jan. 2, 2020

(30) Foreign Application Priority Data

Jun. 30, 2018    (DE) ..................... 10 2018 115 900.5

(51) Int. Cl.
*B64D 11/06* (2006.01)
*B64D 11/00* (2006.01)

(52) U.S. Cl.
CPC ...... *B64D 11/0624* (2014.12); *B64D 11/0015* (2013.01); *B64D 2221/00* (2013.01)

(58) Field of Classification Search
CPC ...... A47B 2083/025; A47B 2200/0072; B60N 3/00; B64D 11/00; B64D 11/0015;

(Continued)

(56) References Cited

U.S. PATENT DOCUMENTS

| 6,929,218 B1 * | 8/2005 | Sanford | B64D 11/06 244/118.5 |
| 7,689,752 B1 * | 3/2010 | Redford | H04L 67/12 710/305 |

(Continued)

FOREIGN PATENT DOCUMENTS

| EP | 3228542 A1 * | 10/2017 | ........ H04W 52/0229 |
| WO | WO-2009036375 A1 * | 3/2009 | ......... G06F 3/04886 |

(Continued)

*Primary Examiner* — Jose V Chen
(74) *Attorney, Agent, or Firm* — Jenkins, Wilson, Taylor & Hunt, P.A.

(57) ABSTRACT

An aircraft seat with a voltage supply port associated only with the aircraft seat and/or a data port associated only with the aircraft seat, a voltage supply unit, associated with the aircraft seat and including a voltage input and a voltage output, each of which is connected to another of the voltage supply ports, a switching circuit associated only with the aircraft seat and hooked up between the voltage output and the voltage supply port and/or between the data port and a data network, with which each of the voltage supply port or each of the data port can be activated or deactivated. A control unit is associated only with the aircraft seat and connected to the switching circuit, and a near-field communication reading device connected to the control unit and associated only with the aircraft seat for wireless reception of signals from an external near-field communication sending device, wherein the reading device can receive signals from a predetermined group of predetermined near-field communication signals, and the reading device and control unit adapted for the control unit to activate at least one of the voltage supply ports and/or at least one of the data ports only upon reception of one of the signals by the switching circuit in dependence on the received signal.

11 Claims, 2 Drawing Sheets

(58) Field of Classification Search
CPC ........ B64D 11/00151; B64D 11/00152; B64D 11/00153; B64D 11/00155
USPC .......................................... 297/217.3; 108/44
See application file for complete search history.

(56) References Cited

U.S. PATENT DOCUMENTS

| | | | | |
|---|---|---|---|---|
| 8,826,830 B2* | 9/2014 | Pajic | ................ | B64D 11/00152 108/44 |
| 10,149,340 B1* | 12/2018 | Rabii | ................... | G06F 3/03543 |
| 2003/0054687 A1* | 3/2003 | Sanner | ............. | B64D 11/00152 439/535 |
| 2003/0114178 A1* | 6/2003 | Chapelle | ............. | H04W 84/005 455/517 |
| 2004/0077308 A1* | 4/2004 | Sanford | ........... | B64D 11/00151 455/3.06 |
| 2005/0132407 A1* | 6/2005 | Boyer, Jr. | .......... | B64D 11/0647 725/77 |
| 2006/0075934 A1* | 4/2006 | Ram | ................ | B64D 11/00155 108/44 |
| 2006/0175882 A1* | 8/2006 | Schweizer | ............. | B60N 3/004 297/217.3 |
| 2010/0224727 A1* | 9/2010 | Bauer | .............. | B64D 11/00151 244/118.5 |
| 2011/0075337 A1* | 3/2011 | Riley | ....................... | A47C 7/72 361/679.2 |
| 2011/0174926 A1* | 7/2011 | Margis | ............... | B60R 11/0229 244/118.6 |
| 2013/0020845 A1* | 1/2013 | Boomgarden | .......... | H01L 35/30 297/217.3 |
| 2016/0170499 A1* | 6/2016 | Jiang | .................... | G06F 3/0202 345/174 |
| 2016/0297527 A1* | 10/2016 | Everhart | .......... | B64D 11/00151 |
| 2017/0182957 A1* | 6/2017 | Watson | .................. | G08C 17/02 |
| 2018/0123679 A1* | 5/2018 | Hansen | .............. | H04B 7/18506 |
| 2018/0217984 A1* | 8/2018 | Ohyama | ............ | B64D 11/0015 |
| 2018/0290753 A1* | 10/2018 | Gledich | .............. | B64D 11/064 |
| 2019/0031366 A1* | 1/2019 | Lauer | .................. | H04B 5/0037 |
| 2019/0112050 A1* | 4/2019 | Ibrahim | ................. | G06N 20/00 |
| 2019/0126852 A1* | 5/2019 | Hupperich | ......... | B64D 11/0023 |
| 2020/0002004 A1 | 1/2020 | Koehn | | |
| 2020/0094985 A1* | 3/2020 | Quatmann | .......... | B64D 45/00 |
| 2020/0204464 A1* | 6/2020 | Watson | ................ | B64F 5/60 |
| 2020/0290523 A1* | 9/2020 | Pajic | ..................... | A47B 23/00 |

FOREIGN PATENT DOCUMENTS

| | | | | |
|---|---|---|---|---|
| WO | WO-2014075040 A1 * | 5/2014 | ............. | B64D 11/06 |
| WO | WO-2018183820 A1 * | 10/2018 | ....... | B64D 11/00151 |

* cited by examiner

AIRCRAFT SEAT, AIRCRAFT SEAT ARRANGEMENT WITH AN AIRCRAFT SEAT AND AIRCRAFT WITH AN AIRCRAFT SEAT ARRANGEMENT

CROSS-REFERENCE TO RELATED APPLICATION

This application claims priority to German Patent Application No. 10 2018 115 900.5 filed Jun. 30, 2018, the entire disclosure of which is incorporated by reference herein.

TECHNICAL FIELD

The disclosure herein relates to an aircraft seat, comprising at least one voltage supply port associated only with the aircraft seat and/or at least one data port associated only with the aircraft seat and a voltage supply unit, which is associated with the aircraft seat and which comprises a voltage input for connection to an onboard voltage network of an aircraft and at least one voltage output, each of which is connected to another one of the voltage supply ports. The disclosure herein moreover relates to a seat arrangement with several such aircraft seats and an aircraft with such an aircraft seat or such an aircraft seat arrangement.

BACKGROUND

Aircraft seats may have voltage supply ports and/or data ports, which allow the respective passenger for example to connect electrical devices and thus be supplied with electricity and data on board. Furthermore, such voltage supply ports or data ports may be permanently connected to devices associated with the aircraft seat and supply them with electricity or data. One example of the latter devices is a monitor screen of an onboard entertainment system. The voltage supply ports are usually connected via a voltage supply unit to the onboard network of the aircraft. The voltage supply unit may thereby convert the voltage of the onboard network to a suitable output voltage and, when a voltage supply unit is provided for several aircraft seats, distribute the voltage of the onboard network to the different voltage supply ports.

If the voltage supply ports or data ports of the aircraft seat can be activated and deactivated at will, it is possible to provide the particular passenger with an activated voltage supply port or data port individually at their aircraft seat, for a fee. In this way, the air fare can be kept low if the passenger does not require any voltage supply port and/or data port. Yet this service can still be provided for those passengers who so desire this.

For the optional activating and deactivating of functions, a central control system is usually provided, such as a central cabin management system in particular. It is then possible, for example, to configure the individual voltage supply ports and data ports or the voltage supply unit such that they can be connected to the central control system and be actuated by the latter in order to activate the individual voltage supply ports or data ports at will. Especially in the case of airline companies offering low-price flights, however, the onboard equipment provided for passenger comfort may be reduced for cost reasons and there may be no connection of the voltage supply ports and data ports or the voltage supply unit or the passenger seat to a central control system, or even to any central control system at all. In such instances, however, it would be advantageous to provide passengers with an activated voltage supply port or data port and the functionalities connected with them, for an added price.

The problem which the disclosure herein proposes to solve is to provide an aircraft seat of the kind mentioned above, which is simple and economical to produce and operate and which can be activated arbitrarily with the voltage supply ports or data ports, as well as an aircraft seat arrangement with several such aircraft seats and an aircraft with such an aircraft seat or such an aircraft seat arrangement.

This problem is solved by an aircraft seat, an aircraft seat arrangement, and an aircraft as disclosed herein. Advantageous embodiments of the aircraft seat and the aircraft are disclosed herein.

According to the disclosure herein, an aircraft seat is provided, comprising one or more voltage supply ports associated only with the aircraft seat and/or one or more data ports associated only with the aircraft seat, a voltage supply unit, a switching circuit associated only with the aircraft seat, a control unit associated only with the aircraft seat, and a near-field communication reading device associated only with the aircraft seat. In other words, the voltage supply ports, the data ports, the switching circuit, the control unit and the near-field communication reading device are provided separately only for the aircraft seat and are not shared with other aircraft seats. On the other hand, the voltage supply unit may either be assigned likewise only to the aircraft seat and not be shared with other aircraft seats or it may be assigned to several aircraft seats and fulfil the following described functions identically for them.

The voltage supply ports and the data ports or at least some of them are preferably part of the aircraft seat and for example they are integrated in it, such as in an arm rest of the aircraft seat. But it is also possible to provide at least some voltage supply ports and data ports spatially separated from the actual aircraft seat, such as on the back side of a back rest of another aircraft seat, which is then situated during use in front of the particular aircraft seat, such as for the voltage and data supply of a monitor screen integrated in the back rest of the seat in front.

The voltage supply unit, which may also be called an in-seat power supply unit, comprises a voltage input for connection to an onboard voltage network of an aircraft in which the aircraft seat is to be installed, and one or more voltage outputs—connected to the voltage input—each of which is connected to another of the voltage supply ports. Therefore, the number of voltage outputs is equal to the number of voltage supply ports. It should be considered that it is possible for the voltage supply unit to have even further voltage outputs, which are connected to further voltage supply ports of the aircraft seat. Each of the voltage outputs is adapted or configured to put out a voltage which is derived from a voltage present at the voltage input.

The switching circuit is hooked up between the voltage outputs and the voltage supply ports and between the data ports and a data network. Accordingly, with respect to the voltage supply unit it is provided as a separate unit in a separate housing and connected as an external unit to the voltage outputs of the voltage supply unit. With the switching circuit, each of the voltage supply ports and each of the data ports can be activated and deactivated at will, individually or in groups, especially by appropriately making or breaking at will the connection to the associated voltage supply output for each of the voltage outputs and the connection to the data network for each of the data ports. Thus, with the aid of the switching circuit, it is possible to switch the voltage supply ports and the data ports, individually or in groups, between a deactivated state, in which no voltage is present on the voltage supply port or no data is present at the data port, and an activated state in which that is the case.

The control unit is connected to the switching circuit. It may have its own power supply or preferably be connected to the voltage supply unit for its power supply.

The near-field communication reading device is adapted or configured for the wireless reception of near-field communication signals from an external active or passive near-field communication sending device and connected to the control unit. Near-field communication in the sense of the disclosure herein means any kind of noncontact communication between two communication devices, which is only possible when the two communication devices are situated in relative spatial proximity to each other. Only during this temporary spatial proximity to each other can they exchange information and/or data by a predefined communication protocol. For example, the spatial distance of the communication devices from each other within which a data exchange is possible may be a few centimeters, such as less than 15 cm, less than 10 cm or less than 5 cm.

The near-field communication reading device is adapted or configured to receive near-field communication signals from a predetermined group or number of predetermined near-field communication signals. The number of predetermined near-field communication signals of the group is equal to the number of aircraft seats in the assembly. It is therefore possible for the group or number to contain only one predetermined near-field communication signal or two or more predetermined near-field communication signals. The near-field communication reading device and the control unit or the control units are moreover adapted or configured such that the control unit activates one or more of the voltage supply ports and/or one or more of the data ports only in response to the reception of one of the predetermined near-field communication signals from an external near-field communication sending device, which sends out the respective predetermined near-field communication signal, by the switching circuit in dependence on the received predetermined near-field communication signal. For this, the control unit can then directly process a signal corresponding to the received near-field communication signal and relayed by the near-field communication reading device and generate a corresponding control signal for the actuating of the switching circuit, for example, or the near-field communication reading device may generate a first control signal for the actuating of the control units, in dependence on the received near-field communication signal, which in turn generate on the basis of the actuation a second control signal for the actuating of the switching circuit.

In each instance, the group of predetermined near-field communication signals is the same for each such aircraft seat. If several aircraft seats are provided, all aircraft seats will therefore be controlled in identical manner with the same predetermined near-field communication signals. In this way, it is possible in a particularly easy manner for the flight personnel to selectively activate the power supply ports and/or data ports at the particular aircraft seat for individual passengers who so desire this. It is only necessary to send the corresponding one of the predetermined near-field communication signals to the near-field communication reading device when the particular member of the flight personnel is in immediate proximity to the near-field communication reading device. For example, flight attendants may carry along with them a limited number of external near-field communication sending devices, such as NFC or RFID devices, each of which is adapted or configured to send out a different one of the predetermined near-field communication signals from the predetermined group. It is then only necessary to hold the near-field communication sending device corresponding to the desired activation at the near-field communication reading device of the particular assembly. Alternatively, the flight attendants may carry along with them, for example, a device which is adapted or configured to send out at will each of the predetermined near-field communication signals from the predetermined group, such as a mobile telephone outfitted with an NFC chip or a similar device.

The aircraft seat is thus very easy to operate. At the same time, it has a simple and economical construction, since it is not necessary to connect it to a central control system or even to provide any such system. Furthermore, it is easily possible to retrofit aircraft with the optional activation and deactivation of existing voltage supply ports and/or data ports. It is only necessary to provide the near-field communication reading device, the control unit and the switching circuit.

In one preferred embodiment, each of the predetermined near-field communication signals of the predetermined group is associated with another subset of the voltage supply ports and/or data ports. Each subset may thereby contain one or more of the voltage supply ports, one or more of the data ports or both one or more of the voltage supply ports and one or more of the data ports, such as one voltage supply port and one data port. The different subsets may share voltage supply ports and data ports. But it is preferable for each of the voltage supply ports and each of the data ports to belong each time to only one of the subsets. The near-field communication reading device and the control unit are adapted or configured such that, upon reception of one of the predetermined near-field communication signals, the control unit actuates the switching circuit so that it activates the voltage supply port or the data port associated with the received near-field communication signal or the subset of the at least one voltage supply port and/or of the at least one data port associated with the received near-field communication signal. This configuration has the advantage that different functions and/or devices can be activated selectively and separately that are associated with the individual ports or subsets or that are connected to them. In this case, it is preferable for each of the subsets to be associated with a different functionality or a different device, the corresponding devices being in each case connected preferably inseparably or permanently—or alternatively possibly also detachably—to the voltage supply ports and/or data ports of the respective subset. The functionalities and devices may be chosen for example preferably from the group containing an onboard entertainment monitor, an audio output port, a receptacle—possibly also different receptacle types from different countries—, a USB port and a wireless power transmission device.

In one preferred embodiment, one or more of the voltage supply ports is/are not permanently or inseparably connected to a device, but rather they are provided for connection of external devices by the passenger. In this case, several such voltage supply ports may be provided, providing different voltages, such as 110 V alternating voltage, or 5 V DC voltage, and/or different kinds of plugs.

In one preferred embodiment, one, several, or all of the voltage supply ports is/are chosen from the group containing a receptacle—possibly also different receptacle types from different countries—, a USB port and a wireless power transmission device.

In one preferred embodiment, the near-field communication reading device and the control unit are part of an integrated unit and in particular are designed as an integrated unit, while the switching circuit is provided as a separate unit, or the control unit and the switching circuit are part of an integrated unit and in particular are designed as an integrated unit, while the near-field communication reading device is provided as a separate unit, or the near-field communication reading device, the control unit and the switching circuit are part of an integrated unit and in particular are designed as an integrated unit. But it is also possible for the near-field communication reading device, the control unit and the switching circuit to each be part of separate units and in particular to be designed as separate units. Moreover, in each of these instances it is possible for the near-field communication reading device, the control unit and/or the switching circuit to be integrated in a device which is connected, preferably permanently, to at least one of the voltage supply ports and/or to at least one of the data ports. The latter instance makes the retrofitting especially easy.

In one preferred embodiment, the near-field communication reading device is an NFC or RFID reading device. It is then adapted or configured to interact with external NFC or RFID sending devices and to receive NFC or RFID signals as near-field communication signals. The external NFC or RFID sending devices may be for example NFC or RFID tags or chips or mobile devices outfitted with an NFC or RFID function, such as mobile telephones.

In one preferred embodiment, the voltage supply unit comprises a voltage transformer and/or a distributor.

SUMMARY

According to the disclosure herein moreover there is provided an aircraft seat arrangement with several aircraft seats according to one of the above described embodiments. Each of the aircraft seats has thereby the same voltage supply ports and data ports. For each of the aircraft seats of the aircraft seat arrangement moreover the predetermined near-field communication signals of the predetermined group are identical, and the control unit responds in the same way to the reception of near-field communication signals from the predetermined group for all aircraft seats of the aircraft seat arrangement.

According to the disclosure herein moreover there is provided an aircraft with an aircraft seat according to one of the above described embodiments or with a seat arrangement according to one of the above described embodiments. It is possible for the aircraft to have several different aircraft seats or seat arrangements according to one of the above described embodiments.

In a preferred embodiment of the aircraft, for each of the aircraft seats the voltage supply unit, the control unit and the switching circuit is separate from any central control systems, such as for example a central onboard management system, for the central control of functions in the cabin. If the aircraft has a central onboard management system, for example, the voltage supply unit, the control unit and the switching circuit which are associated with each of the aircraft seats are separated from the onboard management system. Alternatively, the aircraft has no central control system at all and in particular no onboard management system.

BRIEF DESCRIPTION OF THE DRAWINGS

In the following, an example embodiment of the disclosure herein shall be explained more closely with reference to the drawings.

DETAILED DESCRIPTION

Figure 1:
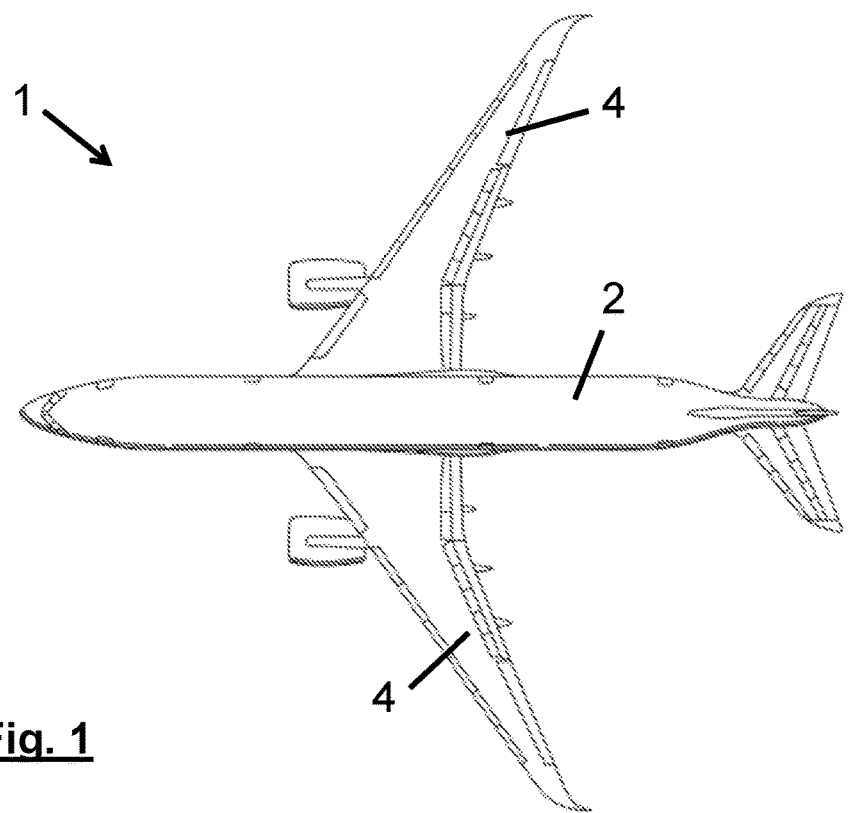
FIG. 1 shows a schematic view of an aircraft.
Figure 2:
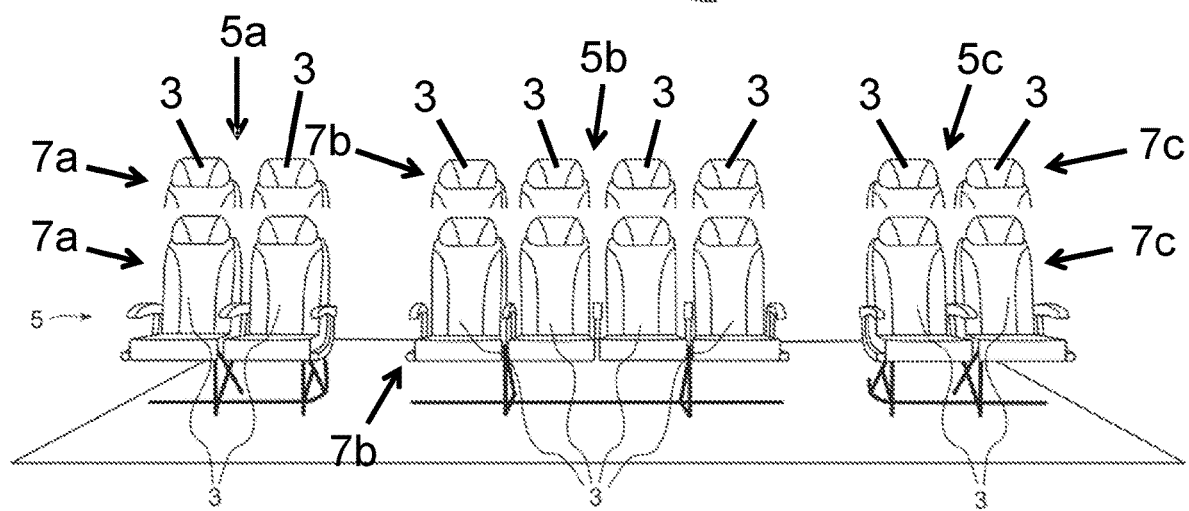
FIG. 2 shows a schematic perspective view of several aircraft seats in an aircraft seat arrangement according to one embodiment of the disclosure herein.

The aircraft 1 shown in FIG. 1 has a fuselage 2 and two wings 4. Inside the fuselage 2 there are arranged a plurality of aircraft seats 3 in an overall arrangement 5, comprising three different aircraft seat arrangements 5a, 5b and 5c (see FIG. 2). The aircraft seat arrangements 5a and 5c are situated here at the two window sides and the aircraft seat arrangement 5b is situated in the middle between the two aircraft seat arrangements 5a and 5c. Each of the aircraft seat arrangements 5a, 5b, 5c has in each case a plurality of identical assemblies 7a, 7b and 7c positioned one after another along the longitudinal axis of the aircraft 1.

Figure 3:
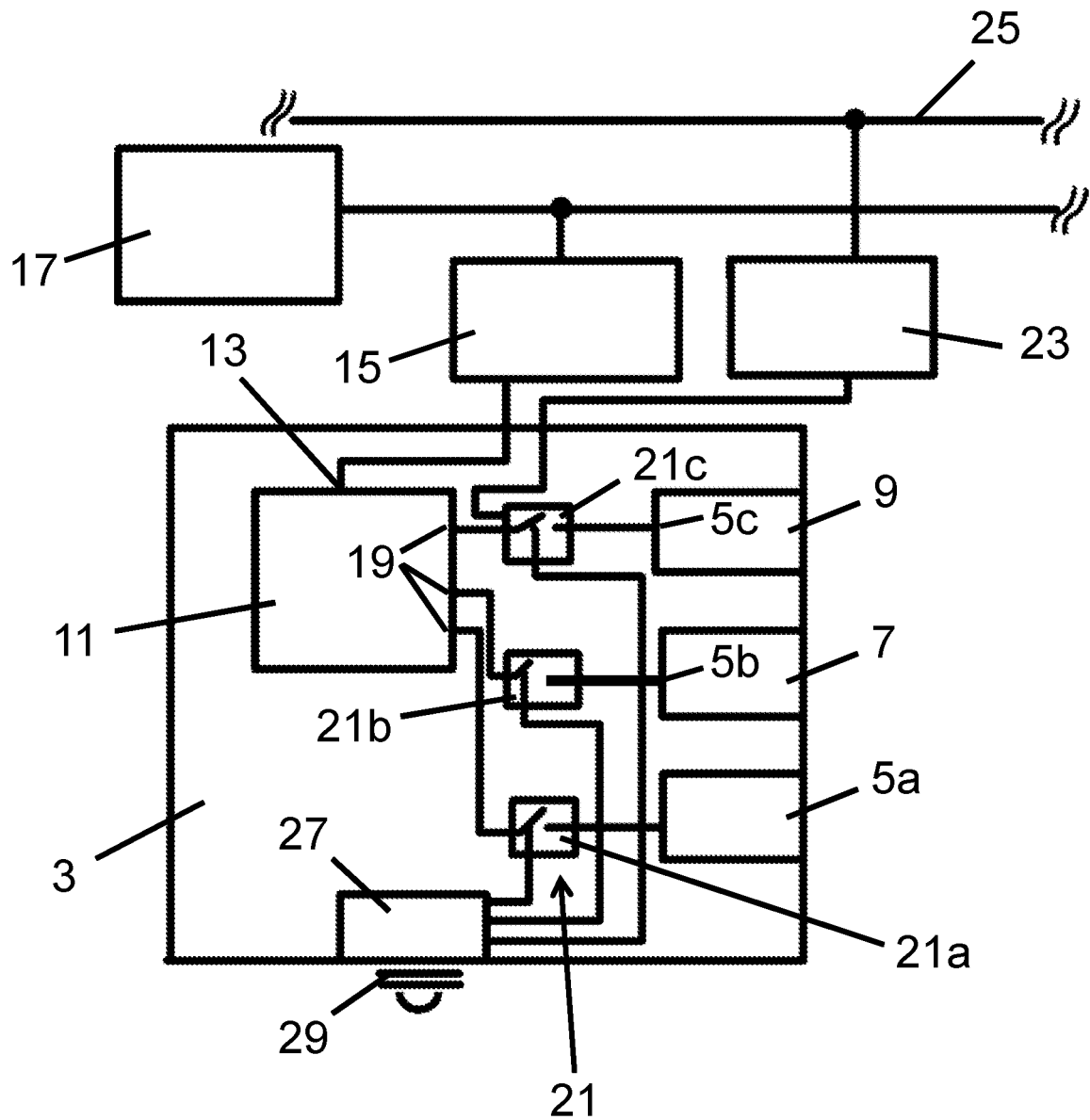
FIG. 3 shows a schematic block diagram of an aircraft seat according to the embodiment shown in FIG. 2.

One of the aircraft seats 3 is represented in FIG. 3 in the form of a schematic block diagram. The aircraft seat 3 has three ports 5a, 5b, 5c, of which the lower two ports 5a and 5b in FIG. 3 are voltage supply ports and the upper port 5c is a combined voltage supply and data port. The voltage supply port 5a is designed for example as a receptacle or a USB port for the connection and power supply of an external device by the passenger. An audio output 7 is permanently connected to the voltage supply port 5b in order to provide audio functionality. A display device 9 of an onboard entertainment system is permanently connected to the combined power supply and data port 5c, being supplied with voltage and data via the port 5c. The ports 5a and 5b and the audio output 7 may for example be integrated in an arm rest of the respective aircraft seat 3. The display device 9 may likewise be integrated in the aircraft seat 3 or it may be integrated in a back rest of a front seat—possibly together with the port 5c.

Each of the voltage supply ports 5a, 5b, 5c is connected in parallel to a voltage supply unit 11, which is associated with the aircraft seat 3 and which the aircraft seat 3 may share with other identical aircraft seats. The voltage supply unit 11 is connected across a voltage input 13 of the voltage supply unit 11 and across an external interface 15 to an onboard network 17 of the aircraft 1.

The voltage supply unit 11 has a separate voltage output 19 for each of the ports 5a, 5b and 5c. Moreover, the aircraft seat 3 has, separately from the voltage supply unit 11, a switching circuit 21, which in turn has three switches 21a, 21b and 21c. Each of the switches 21a, 21b and 21c is hooked up between another of the voltage outputs 19 and the corresponding port 5a, 5b or 5c, so that with the switching circuit 21 each of the voltage supply outputs 5a, 5b and 5c can be optionally switched between an activated and a deactivated state. The switch 21c is furthermore connected across an interface 23 to a data network 25 of the aircraft 1 and arranged between the data network 25 and the data port 5c. Therefore, with the switching circuit 21 the data port 5c can also be optionally switched between an activated and a deactivated state. In other words, by the switching circuit 21 the connection between the voltage supply port 5a and one of the voltage outputs 19, between the voltage supply port 5b and another one of the voltage outputs 19 and between the combined voltage supply and data port 5c and yet another one of the voltage outputs 5c and the data network 25 can be optionally made or broken. The voltage supply unit 11 provides a voltage distributor and a voltage transformer in this case.

Each of the switches 21a, 21b and 21c of the switching circuit 21 is connected to a combined control unit and NFC reading device 27, which in turn is connected to an NFC antenna 29 and adapted or configured in combination with this to receive three predetermined NFC signals, each of which is or can be sent out during operation by another one of three NFC cards 31a, 31b and 31c. The combined control unit and NFC reading device 27 is adapted or configured such that it puts out a corresponding control signal to the switches 21a, 21b, 21c only upon receiving one of the three predetermined NFC signals, i.e., only if one of the three NFC cards 31a, 31b or 31c is brought temporarily into immediate proximity of the NFC antenna 29. The respective control signal is characteristic of the respective NFC card 31a, 31b or 31c, and the switching circuit 21 is adapted or configured to activate a corresponding one of the ports 5a, 5b and 5c upon receiving one of the three possible control signals. These are initially deactivated by default, i.e., at the beginning of a flight. The NFC card 31a is associated with the port 5a, the NFC card 31b with the port 5b and the NFC card 31c with the port 5c.

In order to free up one of the ports 5a, 5b and 5c and thus a receptacle or a USB port, the audio output 7 or the display device 9 for a passenger on the aircraft seat who so desires this, it is therefore only necessary for a flight attendant to select the proper NFC card 31a, 31b or 31c and hold it at the NFC antenna 29.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft seat comprising:
one or more voltage supply ports associated only with the aircraft seat, and no other aircraft seat, and/or one or more data ports associated only with the aircraft seat, and no other aircraft seat;
a voltage supply unit, which is associated with the aircraft seat and comprises a voltage input, which is configured for connection to an onboard voltage network of an aircraft, and one or more voltage outputs, wherein each voltage output of the one or more voltage outputs is connected to a voltage supply port of the one or more voltage supply ports;
a switching circuit associated only with the aircraft seat, and no other aircraft seat, wherein the switching circuit comprises one or more switches, each switch of the one or more switches being connected between one of the one or more voltage outputs and one of the one or more voltage supply ports or between one of the one or more data ports and a data network of the aircraft, wherein each switch is configured such that the voltage supply port or the data port to which each switch is connected, respectively, can be activated or deactivated at will;
a control unit associated only with the aircraft seat, and no other aircraft seat, and connected to the switching circuit; and
a near-field communication reading device, which is connected to the control unit, comprises an antenna, is associated only with the aircraft seat, and no other aircraft seat, and is configured to wirelessly receive of near-field communication signals from an external near-field communication sending device,
wherein the near-field communication reading device is configured to only receive near-field communications, in which receipt of such near-field communications by the near-field communication reading device is only possible when the near-field communication sending device is within less than 15 centimeters (cm) of the antenna of the near-field communication reading device;
wherein the near-field communication reading device is configured to receive any of a group of predetermined near-field communication signals;
wherein the control unit is configured to activate or deactivate, via at least one of the one or more switches, at least one of the one or more voltage supply ports and/or at least one of the one or more data ports only when the near-field communication reading device receives a near-field communication signal defined within the group of predetermined near-field communication signals; and
wherein a decision as to whether the control unit activates or deactivates the at least one of the one or more voltage supply ports and/or the at least one of the one or more data ports is based on which predetermined near-field communication signal of the group of predetermined near-field communication signals is received by the near-field communication reading device.

2. The aircraft seat according to claim 1, wherein each predetermined near-field communication signal of the group of predetermined near-field communication signals is associated with one of the one or more voltage supply ports, one of the one or more data ports, or a subset of the one or more voltage supply ports and/or of the one or more data ports, wherein the near-field communication reading device and the control unit are configured such that, upon reception of one of the predetermined near-field communication signals, the control unit actuates at least one of the one or more switches of the switching circuit to activate the voltage supply port, the data port, or the subset of the one or more voltage supply ports and/or of the one or more data ports that are associated with the predetermined near-field communication signal.

3. The aircraft seat according to claim 2, wherein each respective subset is associated with a different functionality or a different device, which is connected inseparably to the voltage supply ports and/or data ports of the respective subset.

4. The aircraft seat according to claim 3, wherein the functionalities and devices are selected from the group consisting of an onboard entertainment monitor, an audio output port, a receptacle, a USB port, and a wireless power transmission device.

5. The aircraft seat according to claim 1, wherein the near-field communication reading device, the control unit, and/or the switching circuit are part of an integrated unit or wherein the near-field communication reading device, the control unit, and/or the switching circuit are separate units.

6. The aircraft seat according to claim 1, wherein the near-field communication reading device is configured to only receive communication signals complying with near-field communication (NFC) or radio-frequency identification (RFID) protocols.

7. The aircraft seat according to claim 1, wherein the voltage supply unit comprises a voltage transformer and/or a distributor.

8. An aircraft seat arrangement comprising a plurality of aircraft seats according to claim 1, each of which has a same number of voltage supply ports and/or data ports, wherein the group of predetermined near-field communication signals are identical for each of the plurality of aircraft seats, and wherein the control unit of each of the plurality of aircraft seats is configured to respond in a same way when any of the group of near-field communication signals is received at the near-field communication reading device.

9. An aircraft with an aircraft seat arrangement according to claim 8.

10. The aircraft according to claim 9, wherein, for each of the aircraft seats, the voltage supply unit, the control unit, and the switching circuit is separate from any central control systems configured to provide central control of functions in a cabin of the aircraft.

11. An aircraft with an aircraft seat according to claim 1.

* * * * *